Dec. 18, 1956

C. CORUM 2,774,433

TWO-POSITION CONSTANT SPEED SEMI-AUTOMATIC
PROPELLER PITCH CONTROL

Filed Sept. 8, 1952

*INVENTOR.*
CLINTON CORUM

BY

*Knox & Knox*

AGENTS

Dec. 18, 1956    C. CORUM    2,774,433
TWO-POSITION CONSTANT SPEED SEMI-AUTOMATIC
PROPELLER PITCH CONTROL
Filed Sept. 8, 1952    3 Sheets-Sheet 2
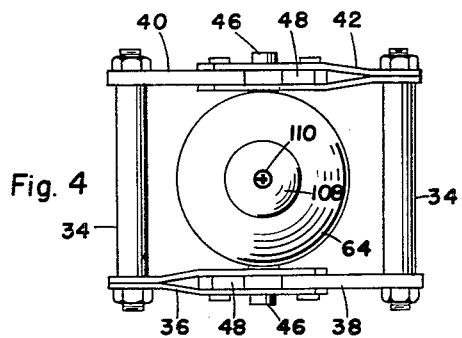
Fig. 4
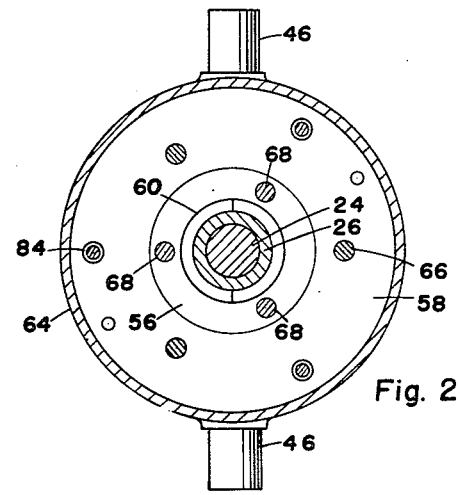
Fig. 2
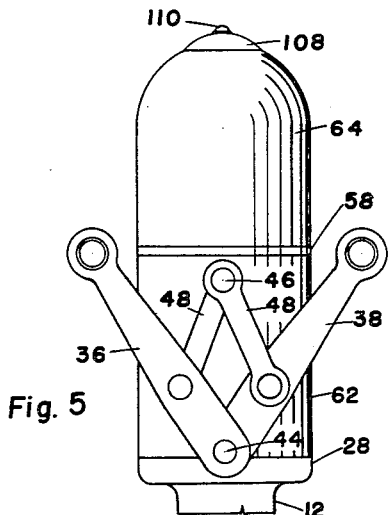
Fig. 5
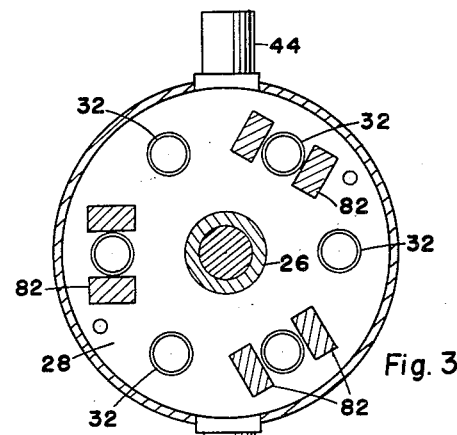
Fig. 3
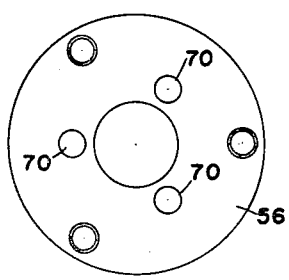
Fig. 6
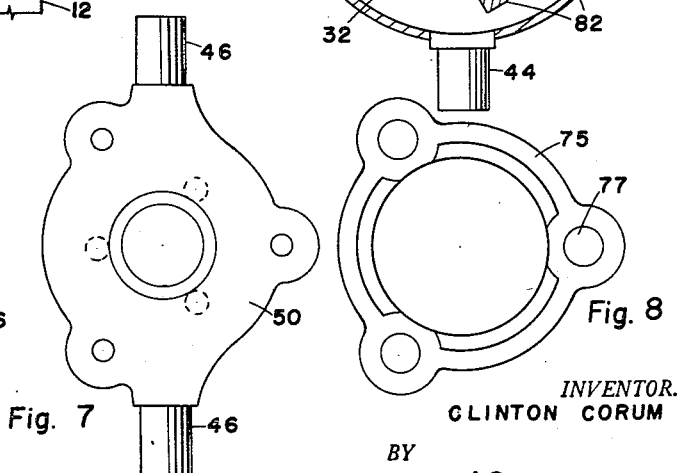
Fig. 7
Fig. 8
INVENTOR.
CLINTON CORUM
BY
Knox & Knox
AGENTS INVENTOR.
CLINTON CORUM
BY
Knox & Knox
AGENTS

United States Patent Office 2,774,433
Patented Dec. 18, 1956

2,774,433

TWO-POSITION CONSTANT SPEED SEMI-AUTOMATIC PROPELLER PITCH CONTROL

Clinton Corum, San Diego, Calif.

Application September 8, 1952, Serial No. 308,437

8 Claims. (Cl. 170—160.16)

My invention relates generally to screw propellers for aircraft and more particularly to attachment to a semi-automatic propeller for converting the same into what may be considered a two position constant speed propeller.

The semi-automatic propeller, sold under the trade name "Aeromatic," is widely known and used, and the present invention has been initially designed for combination with this propeller which includes synchronizer links operatively connected with the blades of the propeller and with a single piston in a small cylinder disposed axially of the hub, and the device hereinafter disclosed as my invention will be mounted on the end of said cylinder and operatively connected with said piston. However, it is quite conceivable that my invention may be used in combination with propeller structures other than the one specifically named above.

As presently supplied, the semi-automatic "air-controlled" propellers make no provision for loss of power and consequent lowered R. P. M. other than by "regulation" of the counterweights, which has to be done on the ground. One of the primary objects of this invention is, therefore, to provide means for automatically compensating for the loss of power experienced at higher altitudes.

The term "two-position" has been chosen for use in this disclosure since my device includes electrically operated means, controlled by the pilot, for effecting one setting or position of functional elements in the device to meet requirements for normal cruising of the aircraft, a second setting or position of these same functional elements being obtainable for use during take-off. The device is designed to secure substantially constant speed of rotation at varying altitudes for cruising and a different and higher constant speed of rotation of the propeller for take-off, at varying altitudes this representing an equally important object of the present invention.

Another object of this invention is to provide means making it unnecessary to adjust a semi-automatic propeller, while grounded, as is now necessary or at least definitely desirable when the air port visited varies by 2500 feet in altitude with respect to the elevation of the air port at which the original adjustment of the semi-automatic propeller was made. Such adjustment has heretofore been required because semi-automatic propellers are "air controlled" and the power output of an aircraft engine varies with the altitude at which it is operated. My invention obviates the necessity of such an adjustment because the pilot can control the engine speed by making the proper setting (position) for take-off, thus assuring sufficiently high engine speed even at air ports of higher altitude. Of course, provision is made for releasing this initial setting after the take-off has been accomplished and sufficient altitude obtained.

Still another object of this invention is to provide means for maintaining constant propeller speed at two different settings by varying the pitch of the propeller blades in direct proportion with the actual power being developed, the index to the power actually developed being the propeller speed.

Yet another object of this invention is to provide an attachment achieving the results mentioned in the immediately preceding object and capable of being attached to the above mentioned particular semi-automatic propeller assembly without any significant change in the original structure thereof.

A last object to be mentioned specifically is to provide a device of the character mentioned above which is inexpensive and entirely practicable to manufacture, which is safe, simple and convenient to operate, and which will give generally efficient and durable service, requiring only infrequent inspection and being completely dependable, it being understood that the basic objects of all changeable pitch propellers, namely safety, improved performance and saving of fuel and upkeep costs, also constitutes basic objects of this instant invention.

With the above objects definitely in view, this invention resides in certain novel features of construction, combination and arrangement of elements and portions as will hereinafter be described in detail in the specification, particularly pointed out in the claims, and illustrated in the accompanying drawings which form a material part of this disclosure, and in which:

Fig. 2 is a transverse sectional view taken substantially on the line 2—2 in Fig. 1, and showing the shell and cap supporting plate;

Fig. 3 is a transverse sectional view, taken substantially on the line 3—3 in Fig. 1, and showing the attachment base largely in elevation with the integral axial tubular portion thereof shown in section, the paired lugs for the locking pawls being also shown in this figure;

Fig. 4 is an elevational view, taken as from the front end of the device, or as viewed from the top of Fig. 1;

Fig. 5 is a plan view of the assembled device, the device being considered as oriented as in normal use with the longitudinal axis of the casing in horizontal position;

Fig. 6 is an elevational view of the part hereinafter referred to as the trunnion stop;

Fig. 7 is an elevational view of the trunnion plate;

Fig. 8 is an elevational view of the spring stop annulus,

Similar characters of reference designate similar or identical elements and portions throughout the specification and throughout the different views in the drawings.

Figure 1:
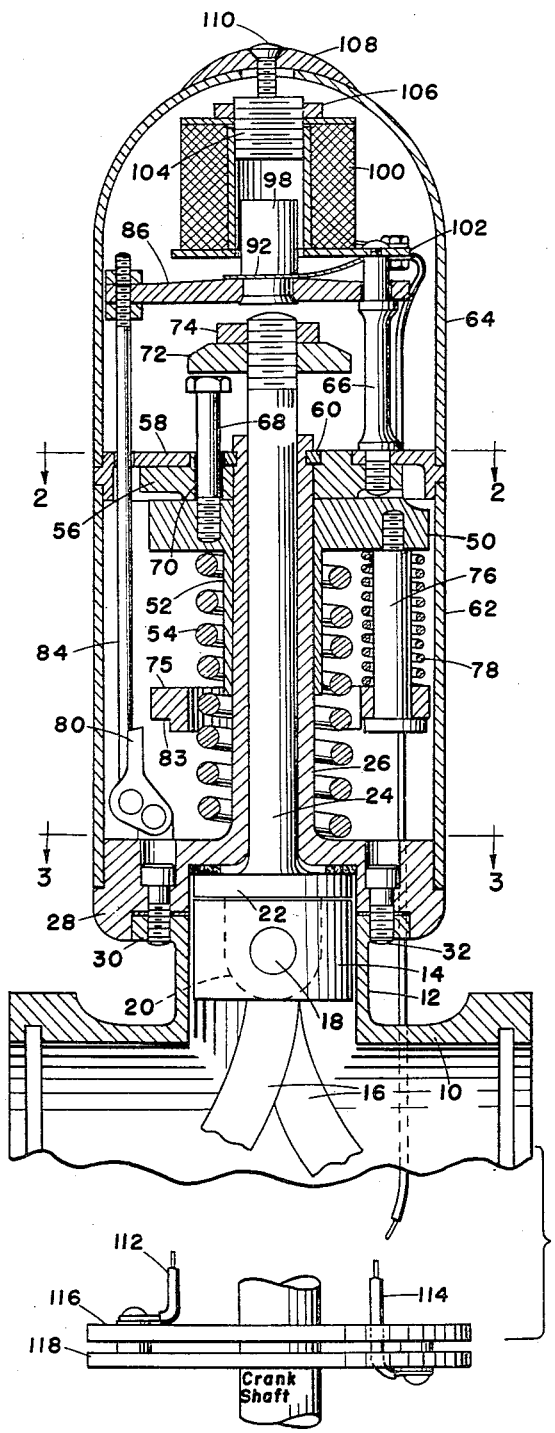
Fig. 1 is a horizontal longitudinal sectional view of the device, with a fragmentary showing of propeller elements wherewith the device is combined, the electrical connections being diagrammatically shown.

Referring now to the drawings in detail, the environment wherewith this invention is adapted to be used includes a propeller hub structure 10 having a projecting cylinder 12 wherein a piston 14 is reciprocally mounted.

Operatively connected to the piston 14 are a pair of synchronizer links 16 which are pivotal on the piston pin 18. Pivotally mounted in the hub 10 are propeller blades 120 having at their root ends flanged retaining plates 122 which are inside the hub. Fixed to each retaining plate 122 adjacent its periphery is a pin 124, the ends of the links 16 being pivotally connected to said pins. The pins 124 are disposed on opposite sides of the hub axis so that as one propeller blade 120 rotates or changes pitch, the link 16 connected thereto causes the piston 14 to move in its cylinder 12, which moves the other link 16 and rotates the other propeller blade 12 a similar amount in the opposite direction. Thus the pitch change of both propeller blades is synchronized through their coupling to the piston 14. Attached to each propeller blade 120 at its root end is a counterweight arm 126 at the end of which is a counterweight 128. The structure described above is that of the well known propeller sold under the trade name "Aeromatic" and shown in U. S. Patent No. 2,359,265. The counterweights 128 control the pitch of the propeller blades 120 so that engine speed is constant, the operation of the propeller being well known to those versed in the art. It will be understood, of course, that the plate normally closing the end of the cylinder 12 will be removed and the structure proposed by this invention will be secured in the place thereof. This present invention has been developed with the view to requiring extremely little modification of such existing propeller constructions when this invention is incorporated therewith.

A pair of opposed lugs 20, illustrated as being integral with an enlarged end portion 22 of a pitch control rod 24, are mounted upon the piston pin 18 to move with this piston 14. The pitch control rod 24 slides axially within a guide tube 26 which is centrally disposed on and integral with a base 28. The cylinder 12 is provided with an attachment flange 30 and a suitable number of screws 32 are used to secure the base 28 to the attachment flange 30, as clearly shown in Figs. 1 and 3.

If reference now be had to Figs. 4 and 5, it will be noted that a pair of fly-weights 34 are supported on and between opposed pairs of arms 36, 38 and 40, 42, on opposite sides of the base 28, which base is provided with a pair of opposed trunnions 44, upon which said arms are pivoted at their inner ends. A pair of similar trunnions 46 are provided for the connection of similar pairs of links 48, whereby a trunnion plate 50, shown in Figs. 1 and 7, having the trunnions 46 fixed thereon, is urged to move axially of the guide tube 26 when the fly-weights 34 shift their positions as a result of changes in rotational speed of the propeller assembly, it being noted that the trunnion plate 50 has an integral sleeve bearing portion freely slidably mounted upon said guide tube 26. A counterbalancing spring 54 is coaxially mounted upon the guide tube 26 and said sleeve portion 52, said spring being compressed between the base 28 and trunnion plate 50, and this spring 54 urges the trunnion plate 50 forwardly thus biasing the fly-weights 34 to shift inwardly.

A trunnion stop ring 56, illustrated best in Figs. 1 and 6, is rigidly secured to what will be herein referred to as the shell and cap supporting plate 58. It may be herein noted that said plate 58 is centrally apertured and a split ring 60 is snapped into position in a groove turned into the forward end portion of the guide tube 26, in co-planar relation with the plate 58, the trunnion stop ring 56 abutting this split ring 60, further promoting rigidity of the assembled elements while allowing for easy disassembly thereof. The hollow cylindrical shell 62 seats on undercut portions of the base 28 and plate 58, and the cap 64 also seats on this plate 58, providing a cover for the inner working parts of the invention, the method of securing the shell and cap being obvious from an inspection of Fig. 1. The spacer studs 66, hereinafter mentioned again in another connection, are inserted through the plate 58 and threaded into a flange portion of the trunnion stop ring 56, as best indicated in Fig. 1 and in Fig. 2. Pressure pins 68, illustrated in the same figures, are threaded into the trunnion plate 50 and extend forwardly through bores 70, indicated in Figs. 1 and 6 in the trunnion stop ring 56, to engage a pressure disc 72 which is threaded onto the forward end of the pitch control rod 24, a lock nut 74 being provided to assure the pressure disc 72 remaining in adjusted position. From the foregoing, it will be clear how the spring 54 urges the pitch control rod 24 in one direction while the fly-weights 34 urge the trunnion plate 50 in the opposite direction upon acceleration of the assembly allowing the pitch control rod 24 to also be urged in the said opposite direction by pitch change of the propeller blades 120 influenced by the counterweights 128.

Figure 9:
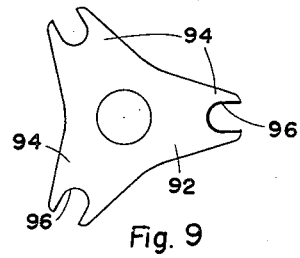
Fig. 9 is an elevational view of the spring employed to bias the pawling spider away from the solenoid.
Figure 10:
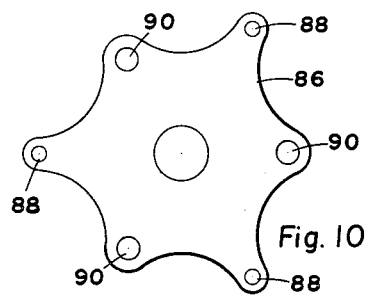
Fig. 10 is an elevational view of the pawling spider.
Figure 11:
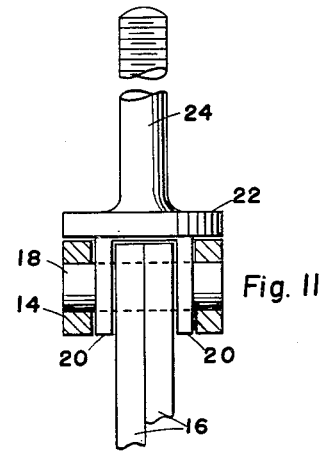
Fig. 11 is a view, partially in cross section, showing the attachment of the synchronizer links and the lugs on the end of the pitch control rod to the piston of the propeller blade synchronizing system.
Figure 12:
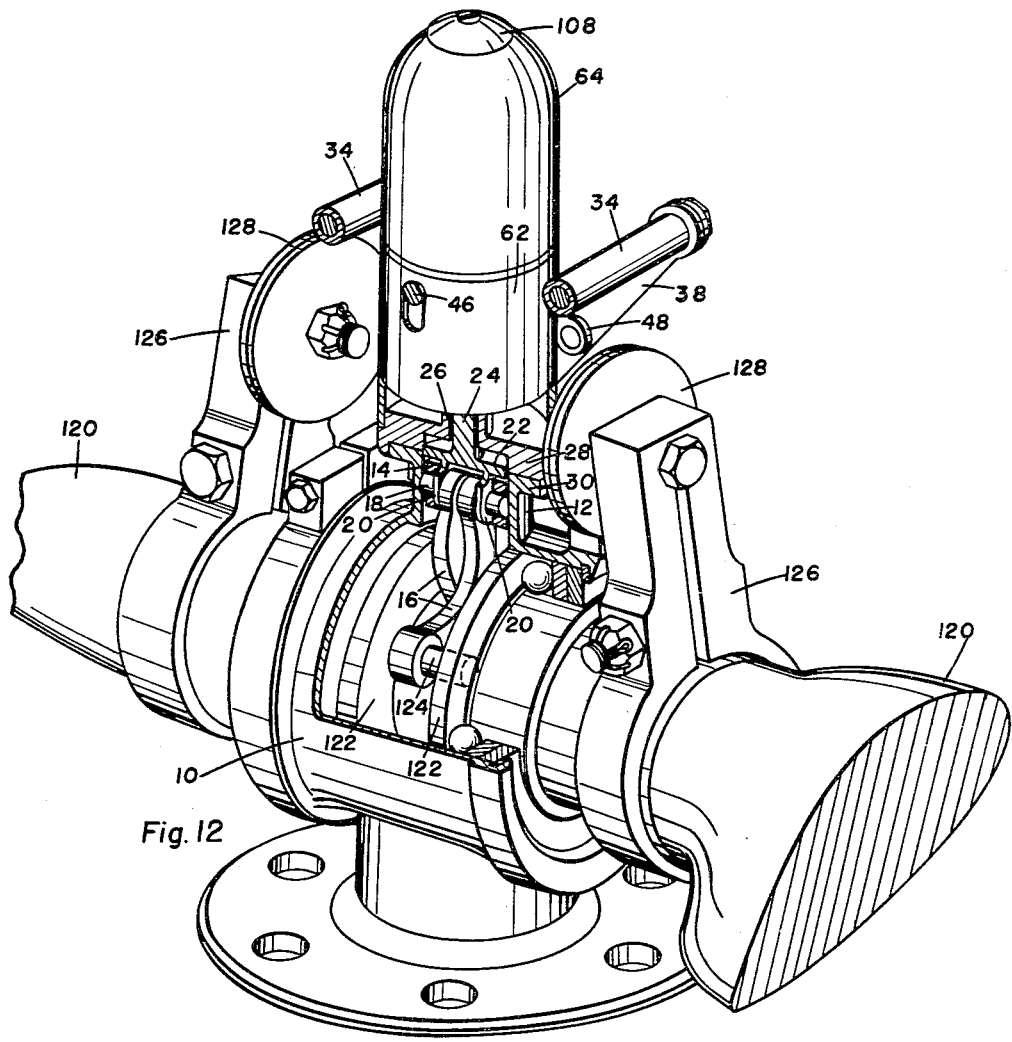
Fig. 12 is a cut-away perspective view of the propeller hub and its internal mechanism.
Figure 13:
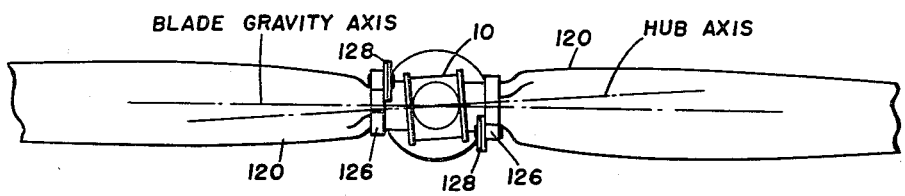
Fig. 13 is a front elevation view of the propeller.

The portions of the invention to be described below relate more particularly to elements provided to enable the pilot to adjust the pitch control assembly for take-off conditions. A spring stop annulus 75 is supported externally of and coaxially with said spring 54 by means of studs 76 screwed into the trunnion plate 50, the shanks of these studs being inserted through circumferentially spaced bores 77 in said annulus 75. Supplementary counterbalancing springs 78 coaxially arranged on the studs 76 urge the annulus 75 rearwardly, away from the trunnion plate, into its limiting position on the heads of the studs 76. A plurality of pawls 80 are pivotally mounted between opposed pairs of lugs 82 on the base 28, so that these pawls may engage the stepped rear face 83 of the spring stop annulus 75 when shifted into one position by pawling links 84. These pawling links 84 are actuated by a pawling spider 86, illustrated best in Figs. 1 and 10, the bores 88 for these pawling links being indicated in the latter figure. The pawling spider is slidably secured in position by means of the spacer studs 66, the bores 90 being provided therefor in the spider, as indicated in Fig. 10. A pawling spider spring 92 of leaf character is provided, a preferred form being illustrated in Fig. 9, as having three terminally notched leg portions 94, the notches 96 therein accommodating upper end portions of the spacer studs 66, this spring 92 being centrally apertured to accommodate the plunger 98 of a solenoid 100 which is provided with a mounting plate 102 whereby the same is rigidly secured to the forward ends of the spacer studs 66, as clearly indicated in Fig. 1, and it may be herein noted that the solenoid 100 is provided with a threaded plug 104 and a lock nut therefor, in order that the action of the plunger may be made subject to adjustment. A concave washer 108 and a screw 110 threaded into the plug 104 are used to hold the cap 64 in position on the supporting plate 58. The solenoid 100 is electrically connected, as indicated at 112 and 114 at the bottom of Fig. 1, with collector rings 116 and 118 suitably mounted on the crank shaft of the engine wherewith this invention is to be used and, of course, with brushes connected with a source of electrical energy and controllable by the pilot in such manner that the solenoid 100 can be energized or deenergized at the pilot's will, the specific wiring arrangements to effect this end being relatively unimportant in this disclosure.

The operation of this invention will be clearly understood from the foregoing description of the mechanical details thereof, taken in connection with the drawings and with the above recited objects of this invention. In recapitulation, however, it should be noted that when the engine is at rest or idling the preload on the spring 54 holds the pressure pins 68 forward so that their forward ends are near or against the pressure disc 72. When the pins 68 move forwardly the pressure disc 72 pulls the pitch control rod 24 forwardly and moves the piston 14 in a forward direction. The foregoing description has repeatedly mentioned the fact that this invention is to be used with a propeller assembly wherein the propeller blade synchronizer links 16 are connected to this piston 14, and the movement of the piston 14 forward shifts the propeller blades to low pitch position, all as will be well understood by anyone skilled in the art to which this invention appertains. As engine speed and power increase, centrifugal force causes the fly-weights 34 to move outwardly, thereby compressing the spring 54 allowing the piston 14 to move rearwardly so that the propeller blades will be progressively urged into higher pitch by the original counterweights 128.

At a predetermined cruising R. P. M. the spring 54 is compressed to a degree where it balances the centrifugal force acting upon the fly-weights 34 at that speed. If the engine should over-speed, the fly-weights will further compress the spring allowing the counterweights 128 to increase the pitch of the blades and consequently increase the load to decelerate the engine to the speed for which the device has been adjusted. If on the other hand, the engine should underspeed, the springs will overcome the weaker centrifugal force acting upon the fly-weights 34, pushing the pressure disc forward and pulling the piston 14 forwardly so that the propeller blades will be shifted to a progressively lower pitch, decreasing the load on the engine and allowing the engine to accelerate to the on-speed number of revolutions per minute as predetermined by the setting of the device.

For take-off more power is required, necessitating a higher R. P. M. of the engine. The increased centrifugal force acting on the fly-weights 34 must be counteracted to a greater degree and this is accomplished by the use of the pawls 80 and their actuating elements, as will now be described more fully. While the engine is idling before take-off the solenoid is energized. Energizing of the solenoid 100 results in the pawling spider 86 and the links 84 being pulled forwardly to cause the pawls 80 to engage the stepped rear face 83 of the stop ring 75, preventing movement of the spring stop annulus 75 and bringing the supplementary counterbalancing springs 78 into play. Since the spring 54 is still fully effective and the action of the springs 78 is additive thereto when the stop ring 75 is arrested by the pawls 80, the total counteracting force is considerably increased, requiring an increased centrifugal force acting upon the fly-weights 34, and consequently a higher R. P. M. of the engine, to shift the control rod 24 and connected parts rearwardly. The result is, obviously enough, that the device is thereby adjusted for low pitch at a higher R. P. M. for take-off. After take-off, to return to cruising R. P. M. speed, it is only necessary to return the pawls 80 to the position indicated in Fig. 1 and this is accomplished by the pilot by simply deenergizing the solenoid 100 accomplished by opening the circuit to the solenoid, and then throttling the engine to a considerably lower speed momentarily to allow the pawls 80 to disengage from the spring stop annulus 75, whereafter the engine will be returned to full speed and the blades will be automatically maintained at the cruising on-speed R. P. M. setting of the device.

It will be clear that all of the objects recited above are amply achieved by this invention, and further description would appear to be unnecessary.

Minor variation from the enclosed embodiment of this invention may be restorted to without departure from the spirit and scope of this invention, the metes and bounds of which are defined by the appended claims.

I claim:

1. Constant propeller speed maintaining means characterized by having dual settings, comprising a guided plunger movable parallel to the propeller axis of rotation, fly-weights operatively connected to said plunger such that extension of said fly-weights under inertia releases said plunger for movement independently of the fly-weights, a fly-weight counterbalancing means operatively connected with said plunger to bias the plunger in one direction, connection means for operatively connecting said plunger to the blades of a propeller for pitch control such that movement of the plunger in said one direction reduces the pitch of the blades, an auxiliary counterbalancing means and means for engaging and disengaging said auxiliary counterbalancing means with said plunger to add to the force of said first mentioned counterbalancing means in two selective stages.

2. Constant propeller speed maintaining means characterized by having dual settings, comprising a guided plunger movable parallel to the propeller axis of rotation, fly-weights operatively connected to said plunger, a fly-weight counterbalancing spring means operatively connected with said plunger to bias the plunger in one direction, connection means for operatively connecting said plunger to the blades of a propeller for pitch control such that movement of the plunger in said one direction reduces the pitch of the blades, and means to add to the fly-weight counterbalancing force of said spring means comprising an auxiliary spring and a spring stop means both connected to said plunger for normally moving with the plunger, and means for arresting said spring stop means temporarily to render said auxiliary spring effective and additive to said spring means.

3. Constant propeller speed maintaining means characterized by having dual settings, comprising a guided plunger movable parallel to the propeller axis of rotation, fly-weights operatively connected to said plunger, a fly-weight counterbalancing spring means operatively connected with said plunger to bias the plunger in one direction, connection means for operatively connecting said plunger to the blades of a propeller for pitch control such that movement of the plunger in said one direction reduces the pitch of the blades, spring stop means and auxiliary springs operatively connected to move with said plunger, and releasable means for holding said spring stop means against movement in the direction opposite to said one direction so that said auxiliary springs are additively effective with said spring means.

4. Apparatus according to claim 3 and including means for remotely controlling said releasable means.

5. Apparatus according to claim 1 and wherein said connecting means includes blade pitch synchronizing linkage.

6. Apparatus according to claim 3 and including pivoted arms carrying said fly-weights, a member coaxially slidable with respect to said plunger, links terminally pivoted to said arms and said member, said counterbalancing spring means urging said member in said one direction, said auxiliary springs being compressed between said member and said spring stop means, and said means for holding being remotely controlled.

7. A constant speed attachment for a propeller of the type characterized by a hub with opposed sockets and a pair of blades pivotally mounted in said sockets so that the gravity axes of the blades form small equal angles with the axes of the sockets, with arms fixed to said blades adjacent to said sockets and having counterweights thereon and means for synchronizing the pivotal movements of said blades, and wherein said blades and counterweights are operatively arranged to provide for automatic pitch control of the blades: said constant speed attachment comprising a guided plunger movable parallel to the propeller axis of rotation, fly-weights operatively connected to said plunger in such manner that extension of said fly-weights under inertia releases said plunger for movement independently of the fly-weights, a fly-weight compensating means operatively connected with said plunger to bias the plunger in one direction, connection means for operatively connecting said plunger to the said blades for pitch control in such manner that movement of the plunger in said one direction reduces the pitch of the blades, and means to vary the effective force of said compensating means.

8. A constant speed attachment for a propeller of the type characterized by a hub with opposed sockets and a pair of blades pivotally mounted in said sockets so that the gravity axes of the blades form small equal angles with the axes of the sockets, with arms fixed to said blades adjacent to said sockets and having counterweights thereon and means for synchronizing the pivotal movements of said blades, and wherein said blades and counterweights are operatively arranged to provide for automatic pitch control of the blades: said constant speed attachment comprising a guided plunger movable parallel to the propeller axis of rotation, connection means for operatively connecting said plunger to said blades for pitch control, flyweights operatively connected to said plunger in such manner that extension of said flyweights under inertia releases said plunger for movement independently of the fly-weights, a spring operatively connected with said plunger to bias the plunger and said fly-weights in one direction and urge said blades toward lower pitch positions when said spring is not overcome by said fly-weights.

References Cited in the file of this patent

UNITED STATES PATENTS

| | | |
|---|---|---|
| 1,405,643 | Weaver | Feb. 7, 1922 |
| 1,844,227 | Patriarche | Feb. 9, 1932 |
| 1,901,953 | Ferrario | Mar. 21, 1933 |
| 2,294,867 | Bottrill | Sept. 1, 1942 |
| 2,306,096 | Vose | Dec. 22, 1942 |
| 2,359,265 | Hackethal et al. | Sept. 26, 1944 |
| 2,391,778 | Gregor | Dec. 25, 1945 |